July 21, 1970

J. H. CARPENTER, JR

3,521,406

WORKPIECE TREATING APPARATUS

Filed Dec. 4, 1967

July 21, 1970     J. H. CARPENTER, JR     3,521,406

WORKPIECE TREATING APPARATUS

Filed Dec. 4, 1967     9 Sheets-Sheet 6

3,521,406
WORKPIECE TREATING APPARATUS
James H. Carpenter, Jr., Hagerstown, Md., assignor to The Carborundum Company, Niagara Falls, N.Y., a corporation of Delaware
Filed Dec. 4, 1967, Ser. No. 687,701
Int. Cl. B24c 3/06
U.S. Cl. 51—9
29 Claims

ABSTRACT OF THE DISCLOSURE

A workpiece treating apparatus includes a throwing wheel which is universally mounted for rotation about a plurality perpendicular axes. Additionally, the wheel is mounted for movement in the vertical direction, as well as back-and-forth and side-to-side. The wheel is mounted in a treating cabinet through a slot which is sealed by air motors pulling in opposite directions to hold a belt taut against the slot. The wheel may be rotated in opposite directions.

BACKGROUND OF THE INVENTION

Particle throwing wheels have long been used for many purposes such as blasting or peening. It is well known to peen expensive aircraft parts by multiple banks of air blast nozzles. Although the nozzle blast has been sufficient to handle production in the past, the drastic increases in the number of parts requiring peening make in many cases nozzle blast impractical. For example, whereas an aircraft company may have had merely three parts to be peened a few years ago, the same company might now have over 600 parts.

Heretofore, blasting wheels have been generally mounted on a stationary panel with the work being put or rotated in front of the wheels. This arrangement is satisfactory for parts not requiring close peening control or where the part configuration can be disregarded. Many aircraft parts, however, require uniform peening intensity on vertical, as well as horizontal surfaces. It has, thus, become necessary to design a system incorporating universal movement, wheel speed control and reversibility of the wheel in order to program or control the speed, the direction, and the angle of blast to obtain uniform coverage and intensity on surfaces not parallel to each other.

Although the prior art such as U.S. Pat. 2,263,321 has conceived of a centrifugal blasting wheel which may be manually moved to various positions, the art heretofore has not advanced to the stage of fulfilling the needs of the industry.

Another drawback is with conventional throwing wheels which rotate only in one direction it is necessary to swing the entire unit 180° around a vertical axis in order to obtain the opposite rotation. This however, throws off the wheel position in relation to the work a distance equal to the diameter of the wheel or wheel swing which requires a correction of position along the horizontal axis of travel. This in turn necessitates a longer treating cabinet to provide clearance for the horizontal axis position change.

As indicated above, the prior art peens expensive aircraft parts by multiple banks of air blast nozzles. This method, however, is both slow and costly. For example, 8⅜ inch gravity feed nozzles will discharge approximately 25 pounds per minute per nozzle or 200 pounds per minute at 80 p.s.i. and will require approximately 240 horsepower to supply the required compressed air. (In striking contrast to this, the peening wheel of this invention can discharge 600 pounds per minute and with only 8.5 horsepower to discharge particles at approximately the same velocity as the gravity feed nozzle.)

BRIEF DESCRIPTION OF INVENTION

An object of this invention is to provide a universally mounted wheel which can be used for peening and blasting and which is capable of satisfying the above indicated needs of the industry.

A further object of this invention is to provide such a wheel which may be alternatively rotated clockwise and counterclockwise and which can be adjusted to control the stream of particles emanating therefrom.

A still further object of this invention is to provide such a wheel wherein all of the parts are securely locked and housed to prevent them from working loose and damaging the expensive workpieces being treated.

A still further object of this invention is to provide a wheel which is compact in size and can be mounted onto a standard motor shaft.

An additional object of this invention is to provide such a wheel which after having been initially balanced will retain its balance for a long period of time. The fulfillment of this object is particularly important when the wheel is mounted on the motor shaft.

A further object of this invention is to provide such a wheel which with its motor can be housed completely within a treating cabinet.

In accordance with this invention the throwing wheel is mounted for universal movement about a plurality of axes and is reversibly driven with each vane having a pair of symmetrical particle propelling faces. The universal type movement is attained by mounting the wheel to a first mounting unit for rotation about a first horizontal axis. The first mounting unit is in turn mounted to a second mounting unit for rotation about a second horizontal axis which is perpendicular to the first axis. Additionally, the second mounting unit is connected to a third mounting unit for rotation about a vertical axis perpendicular to both of the horizontal axis. The wheel may include rough setting means for adjusting its angular orientation at predetermined angular intervals and may also include fine setting means for setting its orientation between the intervals.

The throwing wheel may also be mounted for movement in a vertical direction by the inclusion of telescopic tubes in its various mounting means. In such a case the feed unit for the wheel is made extendable to maintain continuous feeding thereto while the wheel is being moved vertically. The extendable feed may be attained by the inclusion of a swivel connected to telescopic feed tubes which in turn direct the treating particles into a spout on the wheel.

The unit may also be adapted for movement back-and-forth, as well as from side-to-side. For example, the back-and-forth movement may be attained by mounting the telescopic tubes to a movable car which is moved on the roof of a treating cabinet. The side-to-side motion may advantageously be attained by connecting a screw conveyer to the car or by the incorporation of two such cars one of which is movable in the other car.

Where the unit includes the movable car on the roof of the treating cabinet, the cabinet roof includes a slot with the telescopic tubes extending therethrough. An air motor may be provided to each end of the slot with an end of a belt attached to each air motor and connected to the movable car. The motors pull the belt in opposite directions to hold the belt taut against the slot for sealing the slot. As the car moves, the belt is also moved with one motor acting as a wind-up reel and the other as a feed reel. In an advantageous form of this invention the belt is secured to the car by hollow clamps which also serve as feed tubes.

DETAILED DESCRIPTION

Figures 10, 11, 12, 13:
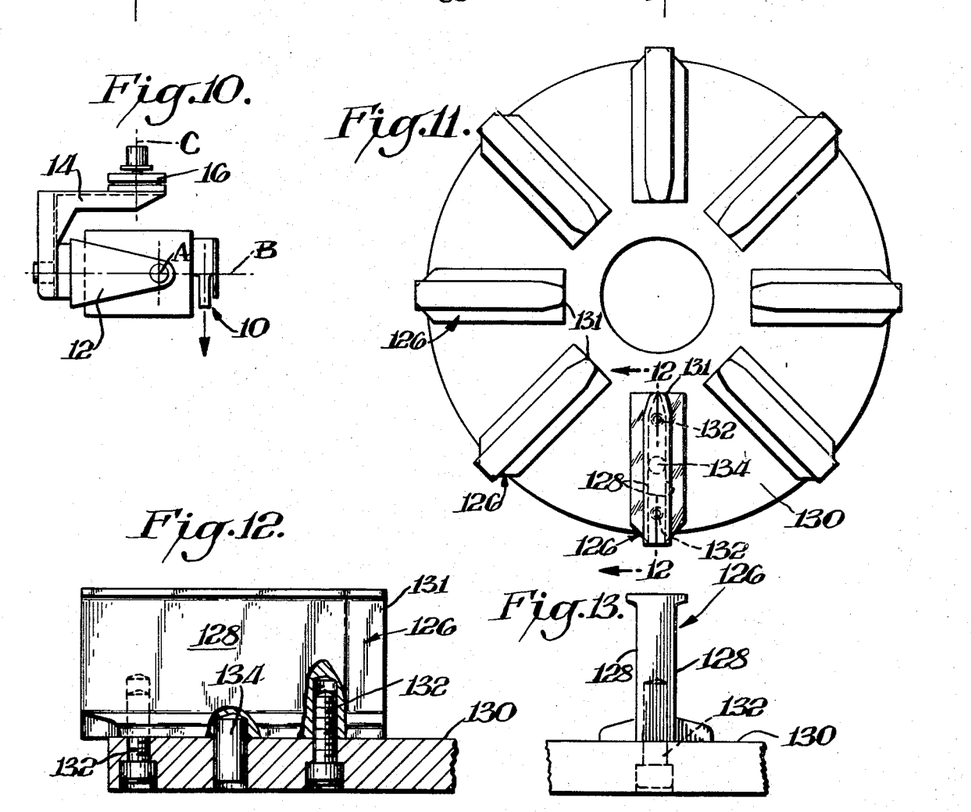
FIG. 10 is a schematic view in elevation of the arrangement shown in FIG. 9.
FIG. 11 is a plan view of a throwing wheel of the arrangement shown in FIG. 9.
FIG. 12 is a side elevation view partly in section of a portion of the wheel shown in FIG. 11.
FIG. 13 is an end view of a portion of the wheel shown in FIG. 11.
Figure 32:
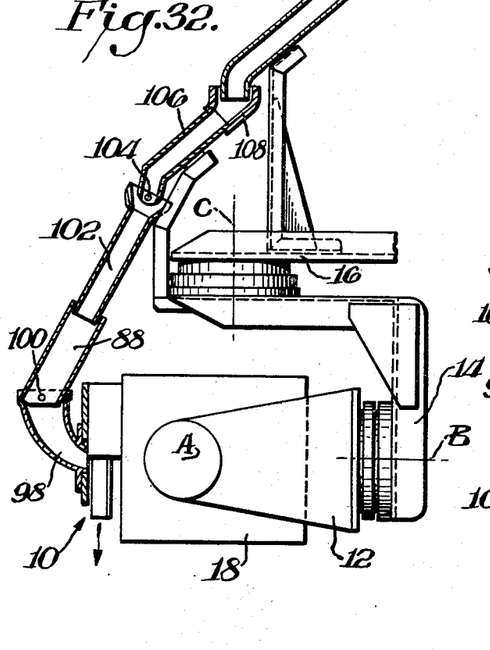

As shown in FIGS. 10 and 32 the throwing wheel 10 is connected to a first mounting unit 12 for pivotal movement about the horizontal axis A. The mounting unit 12 is in turn connected to a second mounting unit 14 for pivotal movement about horizontal axis B which is perpendicular to axis A. Additionally, the second mounting unit 14 is secured to third mounting unit 16 for pivotal movement about vertical axis C. By movements around axes A, B, and C, thus wheel 10 may be considered universally mounted.

Figure 14:
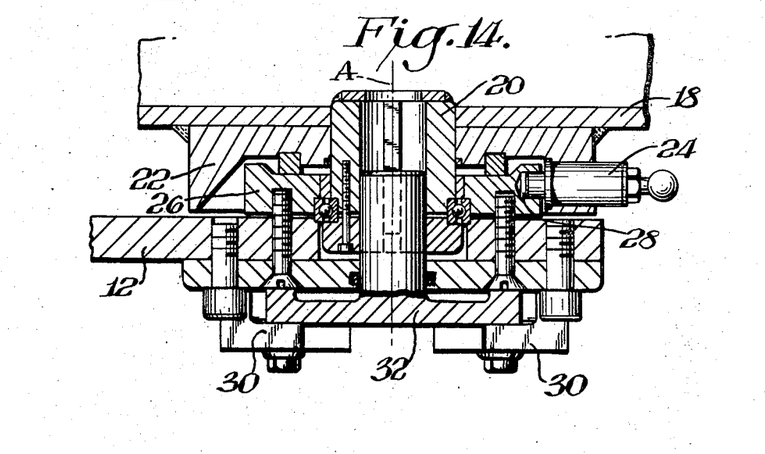
FIGS. 14–18 are views illustrating the rotational arrangement about the axis A shown in FIG. 10.
Figure 15:
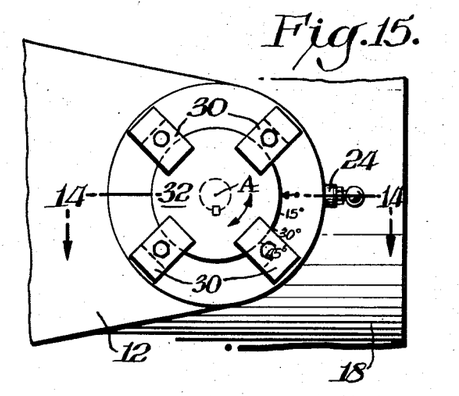
Figure 16:
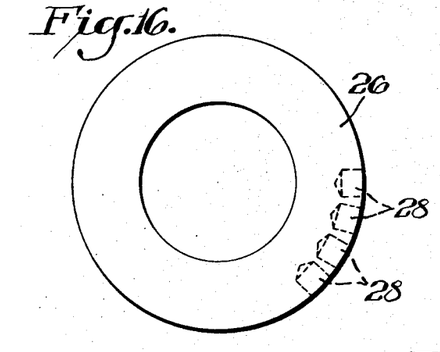

FIGS. 14–18 show the details for enabling wheel 10 to pivot about axis A. The throwing wheel 10 is mounted in housing 18 which rotates about shaft 20 which has its axis coincident with axis A so that the housing 18 (and wheel 10) can rotate with respect to first mounting unit or brackets 12. FIGS. 14–16 show the details for a manual locking arrangement to control this pivotal movement. FIG. 14 is a cross-section taken through FIG. 15 illustrating a plate 22 attached to housing 18 upon which is mounted a spring plunger 24. Mounting unit 12 in turn carries a disc 26 which is shown in plan view in FIG. 16 and which has a series of notches or openings 28 about its periphery spaced at 15° intervals. For quick adjusting of the orientation of wheel 10, the plunger 24 is withdrawn to permit the housing 18 to be rotated until approximately the desired position is attained. Plunger 24 is then released and fits in one of openings 28.

If closer adjustment is desired, the setting between the 15° increments can be obtained by the use of clamps 30 which engage against the plate 32. Thus, rotation about the A axis may be quickly achieved through the use of plunger 24 or finer settings may be attained by manipulation of clamps 30.

In the arrangement shown in FIGS. 14–16, the wheel 10 can pivot 90° although it has been found that the maximum amount of rotation need only be 45°.

Figure 17:
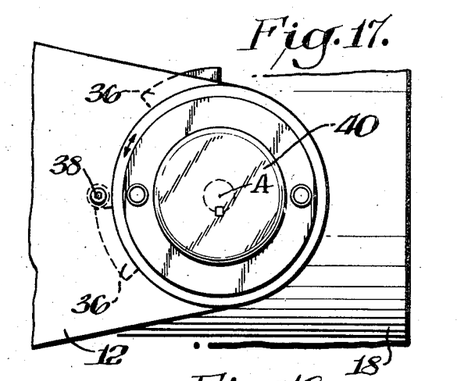
Figure 18:
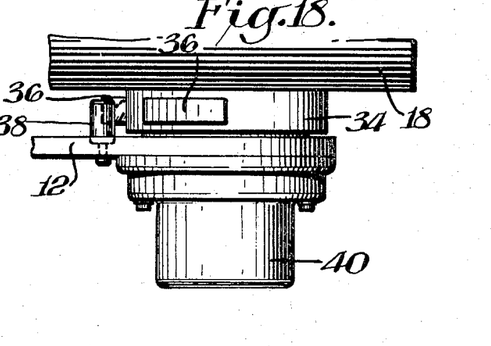

FIGS. 17–18 show an alternative arrangement for setting the position of wheel 10 by the use of powered means instead of the manual operation required for FIGS. 14–16. As indicated therein, a plate 34 is mounted upon housing 18 and includes, for example a pair of spaced stops 36. Additionally, a limit pin 38 is secured to mounting unit 12 with an actuator such as any suitable hydraulic, air or electric actuator 40 mounted where plate 32 of FIG. 14 would otherwise be mounted. Thus, by the use of actuator 40, the housing 18 is rotated and the amount of rotation is controlled by the engagement of limit pin 38 with one of the stops 36. An opposite side pivot may also be provided which is similar to that illustrated herein except that it allows the axial shaft movement without any provision for locking or adding rotary actuators.

FIGS. 19–22 illustrate the details for the rotational movement about the B axis. The pivotal movement about this axis is similar to that about the A axis in that for manual adjustment a notched disc 42 is provided which is secured to second mounting unit 14 with a plunger 44 arranged on first mounting unit 12 for engaging in one of the openings 46 in the disc 42 to provide quick setting at 15° intervals. The fine setting between the intervals is similarly obtained with the use of clamps 48 engaging with plate 50.

Figures 19, 20:
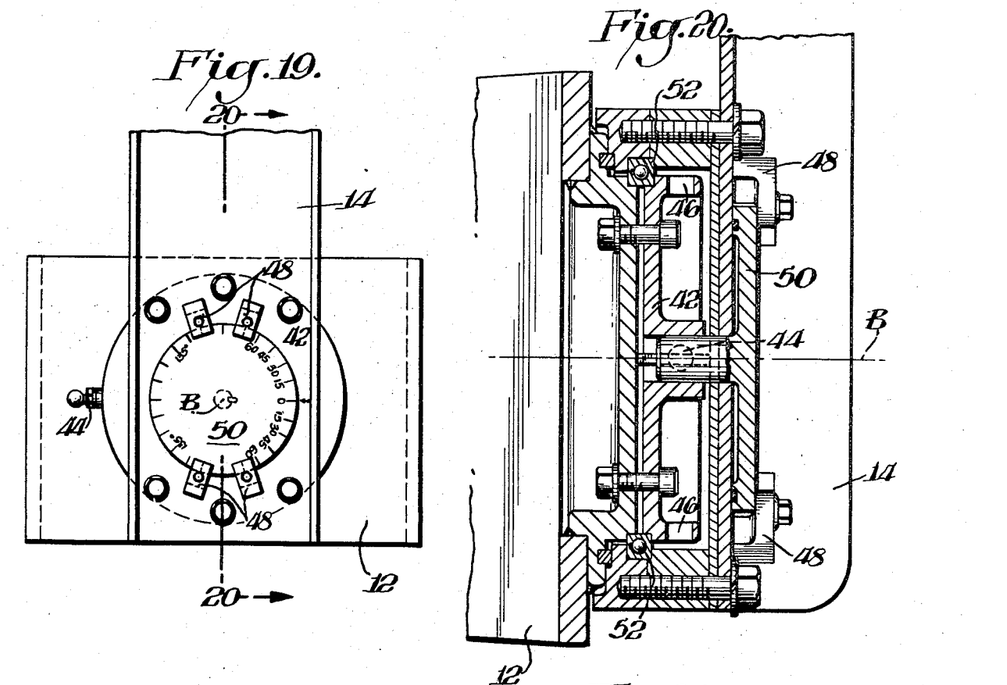
FIGS. 19–22 are views illustrating the rotational arrangement about the axis B shown in FIG. 10.

Since the load is cantilevered, a four point ring ball bearing 52 is utilized to take the radial and moment loads.

Figure 21:
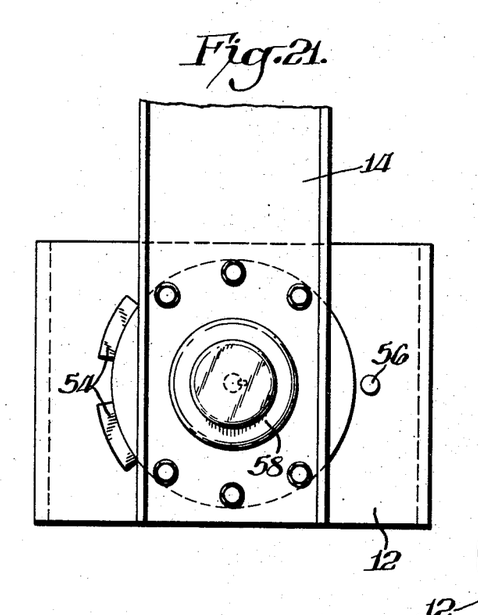
Figure 22:
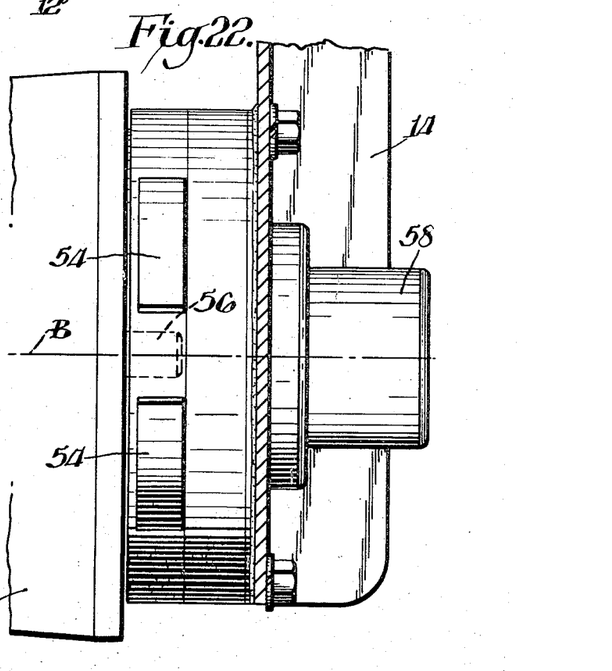

FIGS. 21–22 illustrate another alternative wherein the rotation is power operated similar to FIGS. 17–18. In this arrangement a pair of stops 54 are provided to limit the movement of pin 56 with the power being supplied by actuator 58.

Although the wheel can rotate a full 360° about axis B, it has been found that 270° is the maximum normally rotated with 135° rotation to either side of the vertical center line.

Figures 23, 27A:
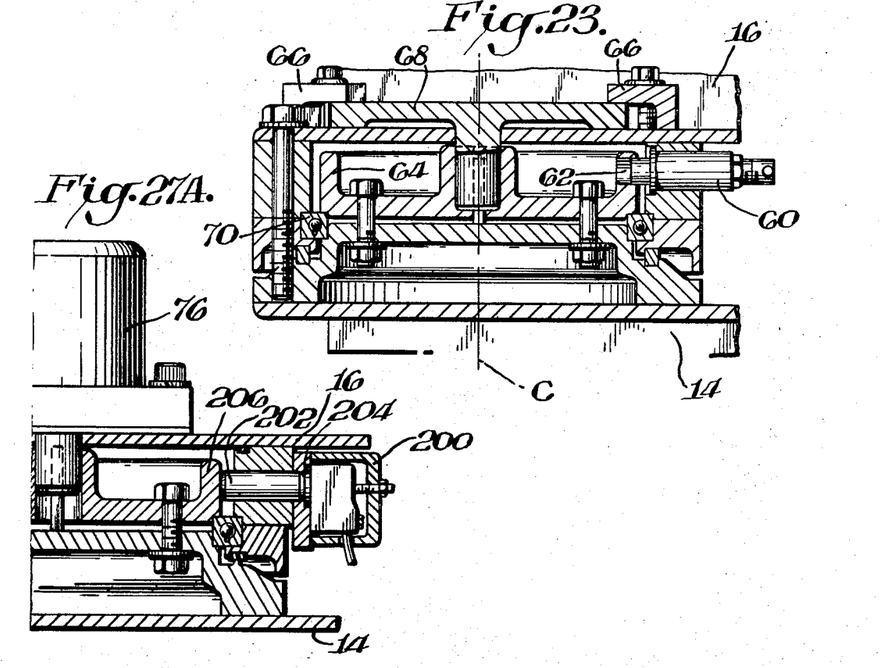
FIGS. 23–27A are views illustrating the rotational movement about the axis C of FIG. 10.
Figure 24:
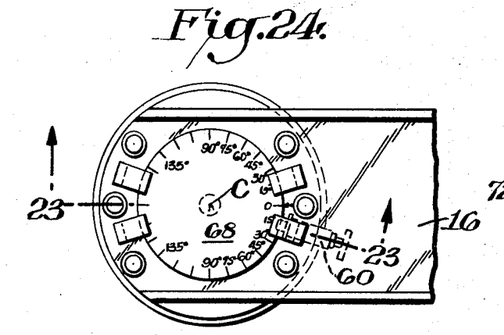
Figures 25, 26:
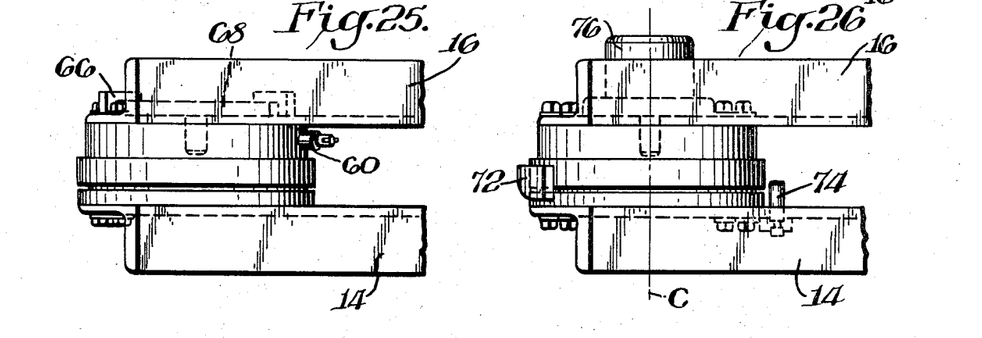
Figure 27:
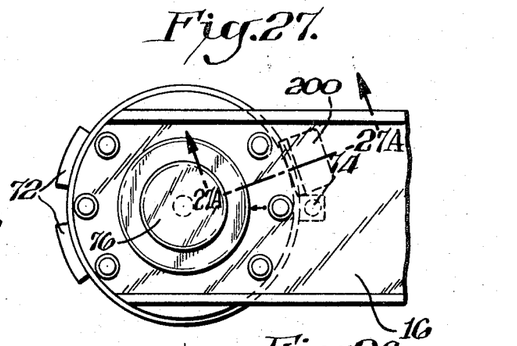

FIGS. 23–27 illustrate the details for the rotational movement about the C axis. Once again these details are similar to that shown in FIGS. 14–18 in that 15° interval settings may be attained by the use of plunger 60 engaging in openings 62 of plate or disc 64 with the fine settings being accomplished by means of clamp 66 engaging plate 68 (FIGS. 23–25). Additionally, as with the movement about the B axis a four point ring ball bearing 70 is provided. The powered movement is also attainable similar to the movement about the A axis, through the use of stops 72, limit pin 74 and rotary actuator 76. Again as with the rotation about the B axis, a full 360° rotation is possible, however, 270° is the normal maximum with 135° rotation to either side.

The various pivotable movements have been indicated as being either manually or power actuated such as by means of a hydraulic actuator to give infinite position adjustment.

As also illustrated above with respect to FIGS. 17–18, 21–22, and 26–27 hydraulic actuators are quite useful for controlling rotation about the A, B, and C axes. It has been found, however, that because of leakage the hydraulic actuators might not hold the unit in a given position. Accordingly, where hydraulic actuators are utilized it is also desirable to provide hydraulic brakes. Although such a brake would be provided at each pivot position, for the sake of simplicity a suitable hydraulic brake is illustrated only in FIGS. 27 and 27A which is a section taken through FIG. 27. As indicated in FIG. 27A, a brake 200 actuates plunger 202. After the hydraulic actuator 76 has moved the unit to its desired position about the C axis, pressure is applied to the brake piston 204 which in turn pushes the plunger 202 against the rotating rim 206 to thus lock the rim in position. As noted above, similar hydraulic brakes would also be provided for pivot axes A and B.

Figure 29:
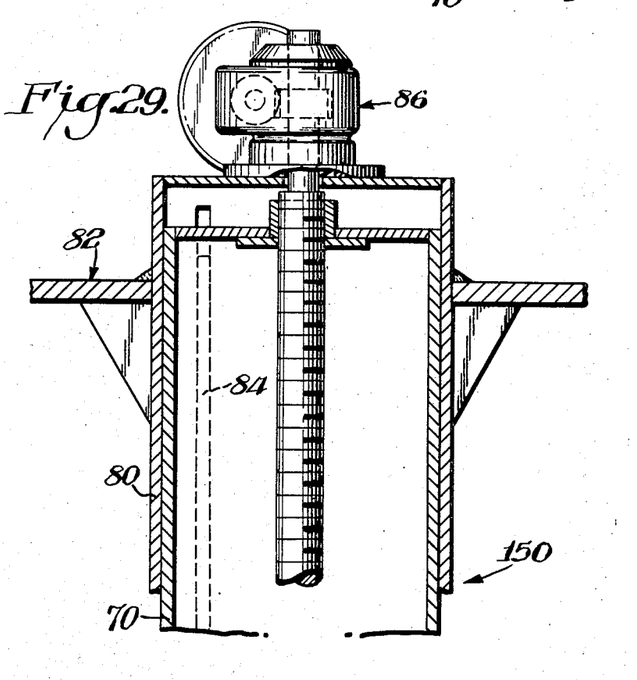
FIG. 29 is a cross-sectional view illustrating the vertical movement for the throwing wheel in accordance with this invention.

In addition to the movement about the A, B, and C axes, wheel 10 may also be moved vertically in the Z direction. This may be accomplished as shown, for example in FIG. 29 by securing third mounting unit 16 to the inner tube 70 of a pair of telescopically mounted tubes 70, 80. The outer tube 80 is secured to a car 82, as later described in greater detail, and outer tube 80 is keyed or splined at at 84 to prevent rotation of tube 70. Vertical movement may be supplied by any suitable power or manual means such as the motor operated screw jack 86 or by a screw and nut assembly.

Where vertical movement is utilized it is necessary to provide extendable feed means for the wheel 10 to assure that the particles will be continuously fed to the wheel while minimizing any adjustment thereto.

Figure 34:
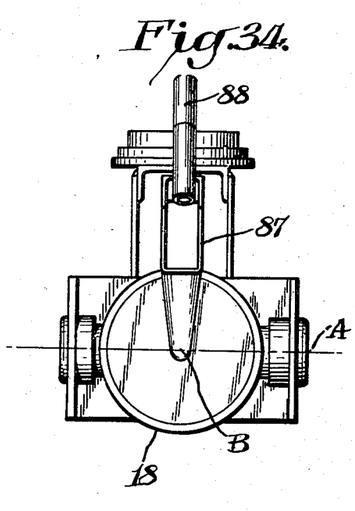
Figure 35:
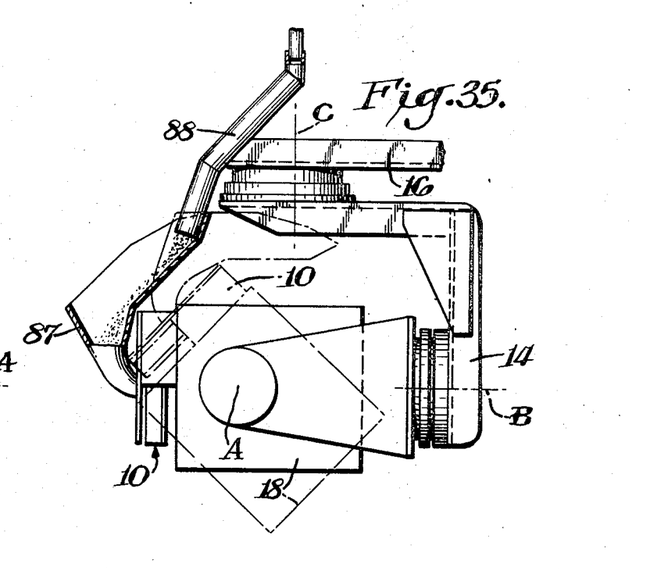

FIGS. 34–35 show one feed spout arrangement which permits the wheel 10 to be rotated 45° about the A axis (as shown in solid and phantom in FIG. 35) without requiring adjustment of the feed spout. Thus, with this spout arrangement which includes an elongated feed spout which can be rotated 45° and still receive particles from tube 88, the wheel can be rotated 270° about the C axis and 45° about the A axis without any adjustment of the feed spout 87.

Figures 36, 37, 38:
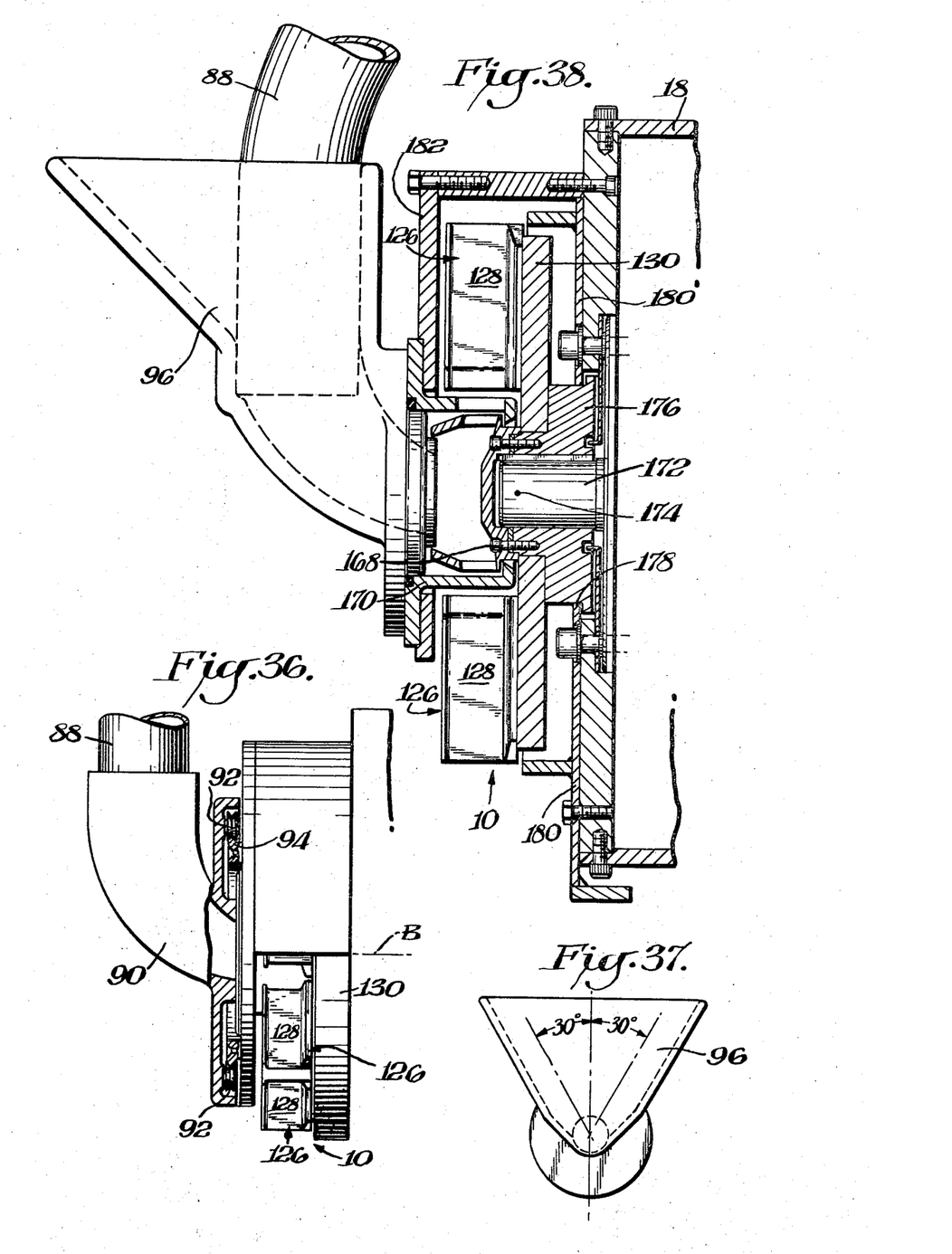
FIG. 38 is a cross-sectional view showing the throwing wheel and its drive connection in accordance with this invention.

FIG. 36 shows still another arrangement wherein the feed spout 90 mounted on rollers 92 (secured to the spout mounting flange) and guide track 94 would permit the spout 90 to swivel. As clearly shown in FIG. 36 the spout which is offset with respect to its mounting flange, has an opening communicating with the flange opening. Spout 90 maintains the abrasive flow as the wheel is rotated which is normally a maximium of 270° about the B axis. This feature enables the operator to index and roll the unit automatically from outside the blasting or peening room.

FIG. 37 shows an end view of still another spout 96 which is flared to pivot around 30° to either side of the vertical center line. This feature can be used with the swivel joint, later described in FIGS. 32 and 33, to give 270° rotation about the C axis and 30° on each side of the center about the axis B without manual adjustment.

Obviously depending upon the particular needs and conditions, any one or all of the various spouts and swivels can be used to carry out the objects of this invention.

Figure 33:
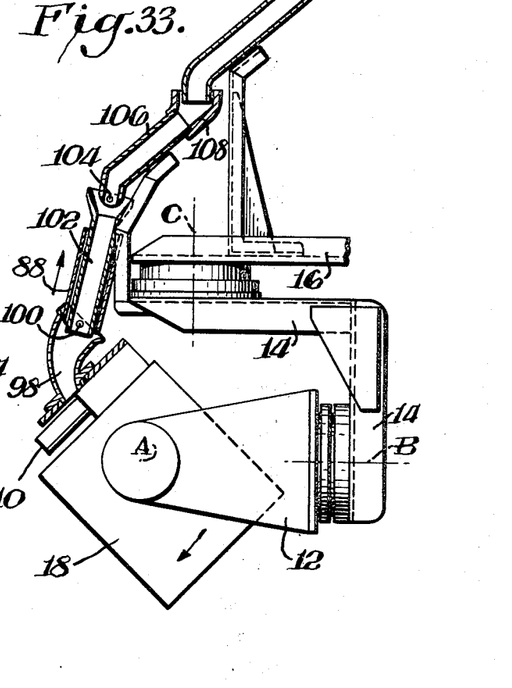

FIGS. 32–33 show a further arrangement which includes a spout 98 pivotally connected at 100 to tube 88. A telescopic tube 102 is provided within tube 88 and is pivotally connected at 104 to fed tube 106. Feed tube 106 is connected in turn to swivel 108. Thus, during movement of wheel 10 about the A axis, the feed is maintained by the telescopic arrangement of tubes 88 and 102 as better shown in FIG. 33.

Figure 30:
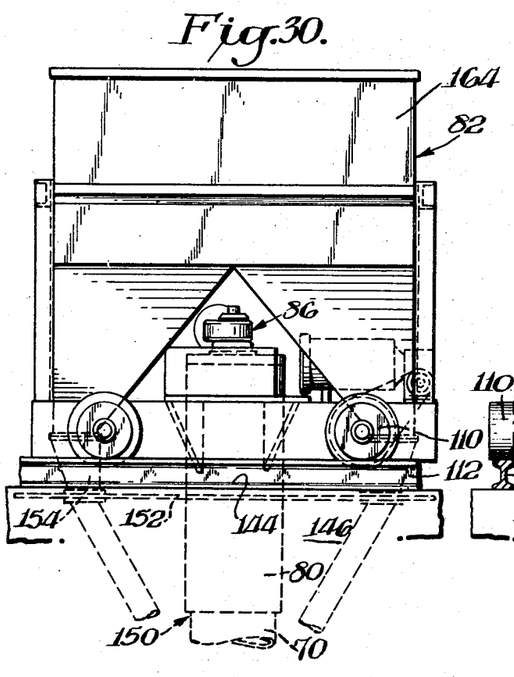
FIGS. 30–37 are views relating to the various feed arrangements for the wheel in accordance with this invention.
Figure 31:
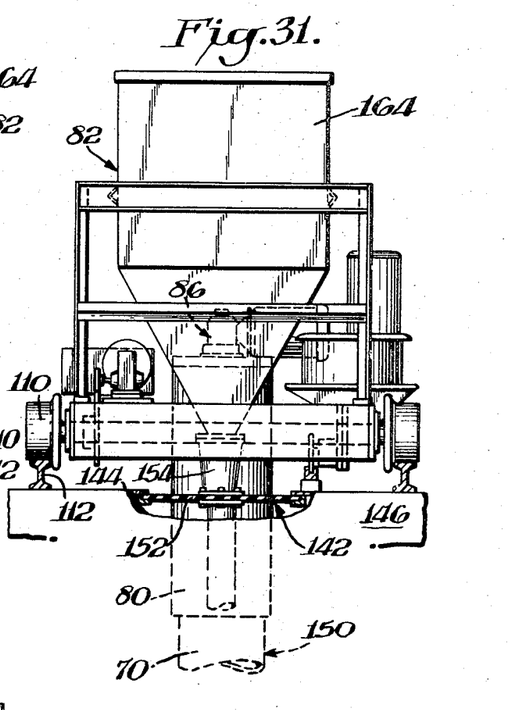

In addition to the movement about the A B, and C axes and the movement in the vertical or Z direction, horizontal movement of the entire assembly is also possible back-and-forth or along the Y axis. This movement might best be understood by reference to FIGS. 1–3 and 30–31. As indicated therein, the entire assembly which includes, for example outer tube 80, is connected to a traveling car 80 which is power driven through wheel 110 (FIGS. 30–31) along tracks 112. Of course other power means such as screws may also be used. The movement of the car 82 can be of constant speed, variable speed or an index movement.

Figure 28:
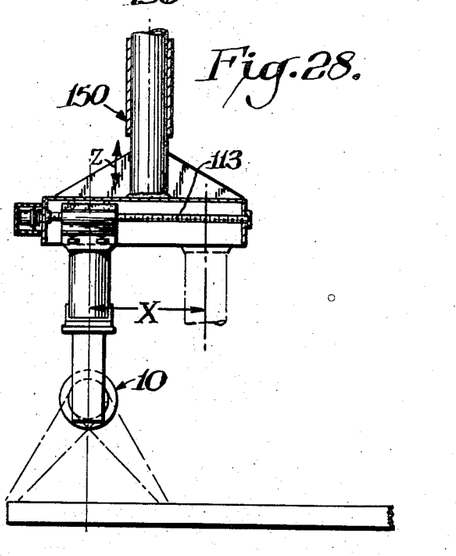
FIG. 28 is a view illustrating the side-to-side motion of the wheel in accordance with this invention.

In addition to the back-and-forth movement along the Y axis the device may move from side-to-side in the X direction. This movement can be similar to that along the Y axis and, for example can be accomplished by mounting a second car within the car 82 with the outer tube 80 being secured to the second car. Alternatively, the side-by-side movement can be accomplished by the horizontal screw device 113 which is illustrated in FIG. 28.

Again as noted with respect to the feed configurations, the wheel can incorporate any or all or any combination of the movements in the A, B, C, X, Y, and Z directions.

A number of advantages are attendant with the arrangement heretofore described wherein the wheel can move in a multitude of directions. For example, the user can easily determine from the blast pattern, speeds, etc., the position for giving optimum control and intensity on a variety of parts. Where new parts require different peening applications, the unit is readily adapted to meet these special applications. Furthermore, with the use of hydraulic actuators and feed back devices, the wheel units can be programmed to suit the parts being peened. With hydraulic actuators the wheel stream direction can be prepositioned by remotely located controls before the peening cycle begins. Additionally, the universal type mounting permits automatically obtaining multiple wheel positions with only one wheel in contrast to having a single wheel for each position which of course would require several wheels per machine.

Figure 8:
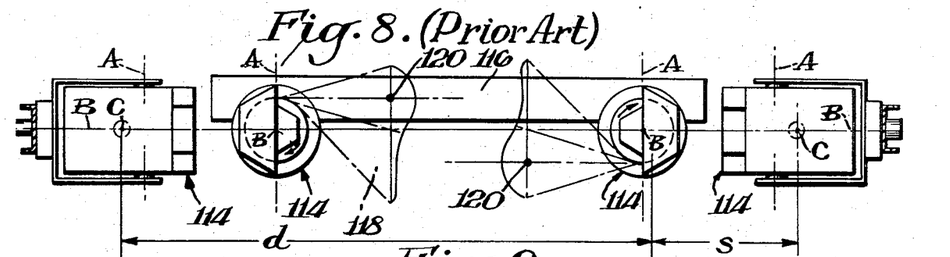
FIG. 8 is a schematic view of a prior art throwing wheel arrangement.
Figure 9:
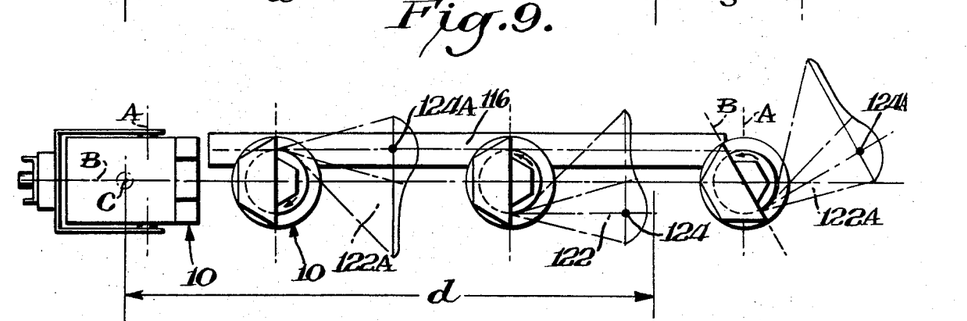
FIG. 9 is a similar schematic view of an arrangement in accordance with this invention.

FIGS. 8–10 relate to a further aspect of this invention. FIG. 8 specifically refers to prior art arrangements wherein a conventional unidirectional rotation blast wheel 114 is used for treating workpiece 116. As the wheel moves in the forward direction from left to right in FIG. 8 and rotates clockwise it ejects a blast stream 118 having a hot spot 120. To cover the part 116 being treated, the wheel 114 must move the distance $d$ with respect to point C of the wheel. When it is desired to reverse the direction of wheel 114, it is necessary to rotate the entire unit 180° which requires further movement along the Y axis beyond distance $d$. This adds to the wheel movement the distance $s$ which is required to compensate for this 180° rotation. Such rotation, however, also results in the hot spot 120 being displaced as indicated therein. This then would require movement about the B axis to dispose the hot spot in the desired location.

FIGS. 9–13 illustrate an aspect of this invention particularly designed to overcome the above shortcomings attendant with such prior art arrangements. In general this is accomplished by providing the wheel 10 with a reversible drive so that the wheel can pass back-and-forth over workpiece 116 by simplying changing the direction of rotation of the wheel from clockwise to counterclockwise. With the clockwise and counterclockwise rotation of wheel 10, it is not necessary to rotate the unit 180°, nor is it necessary to compensate for this rotation by moving the wheel along the Y axis such as the distance $s$ of FIG. 8. It is, however, still necessary to rotate the wheel about its B axis to rotate the hot spot from position 124 to position 124A (FIG. 9).

The elimination of the above two movements results in faster cycling time. Additionally, because a Y axis correction is not necessary both the cabinet and the Y axis travel can be shorter. These advantages are merely exemplary, and other similar savings in wheel manipulation can also be realized with the clockwise-counterclockwise rotational wheel.

Since wheel 10 is rotatable in both the clockwise and counterclockwise directions, the wheel includes particularly designed abrasive propelling vanes 126, each of which has a pair of symmetrical abrasive propelling faces 128 which are rounded at their inner ends 131. As indicated in FIG. 12, the vanes 126 are mounted on runnerhead 130 by bolting from one side of the runnerhead to the vanes by means of a pair of bolts 132 and a shear pin 134.

Because of the wheel 10 with its reversibility, it is not necessary to rotate the wheel unit 180° about the axis C nor is any X axis traveled required. All that is necessary is to rotate the unit in the B axis direction, as illustrated in FIG. 9, to maintain the hot spot in the desired location.

Figure 7:
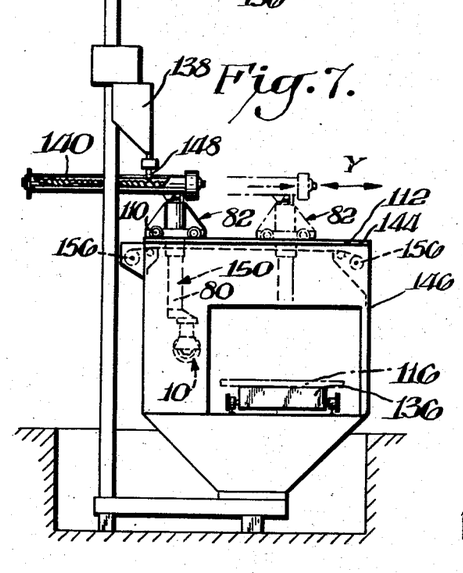
FIG. 7 is an elevational view illustrating the side-to-side movement of the wheel in accordance with this invention.

Another feature of this invention relates to the provision of a treating cabinet and also to the sealing means for the cabinet. As shown in FIG. 7, the work to be peened is placed on the rotating table 136 and the wheel 10 positioned for best coverage of the parts being cleaned. The abrasive or particle feed may be accomplished as shown in FIG. 7 by feeding from the storage bin 138 into a longitudinal slot in screw conveyor 140. From the gate 148 under storage bin 138 the screw conveyor 140 is mounted on car 82 which is movable in the Y direction. As the wheel car moves along the Y axis, the abrasive is fed through the screw conveyor to the feed arrangement 150. A slight screw overflow may be recycled through a spout inside the machine. With this design the wheel 10 can be continuously operated utilizing all of its motions without feed interruptions. An alternative method is the use of telescopic feed spouts which, however, would require greater overall machine height.

Figure 6:
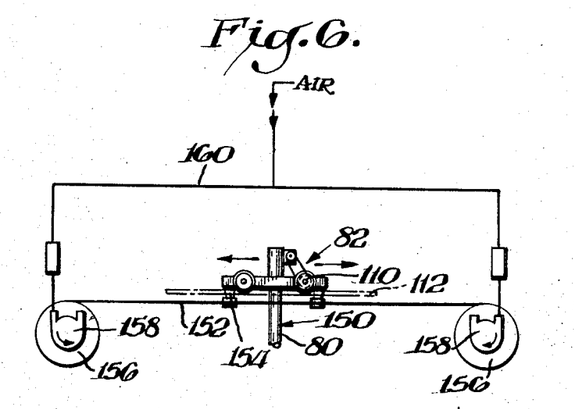
FIG. 6 is a schematic view of the cabinet sealing arrangement in accordance with this invention.

Since the horizontal travel of the unit requires a longitudinal slot 142 in the cabinet roof 144, it is necessary to seal the slot against the escaping abrasive. This is advantageously accomplished by the arrangement schematically shown in FIG. 6. As indicated therein a rubber belt 152 is attached to each end of the car 82, for example by clamps 154. The free ends of the belt are also mounted on rollers 156 at each end of the cabinet. To maintain tension on the belt 152, regardless of the travel direction, an air motor 158 is coupled to each roller shaft and air directed to the motors so that the rotation opposes each other to thus put tension on the belt and hold it taut against the slot. As the car 82 moves (powered by its own drive) one air motor winds up the belt and the other air motor unwinds and acts as a feed. Both air motors 156 are conveniently interconnected by common air lines 160.

Figure 1:
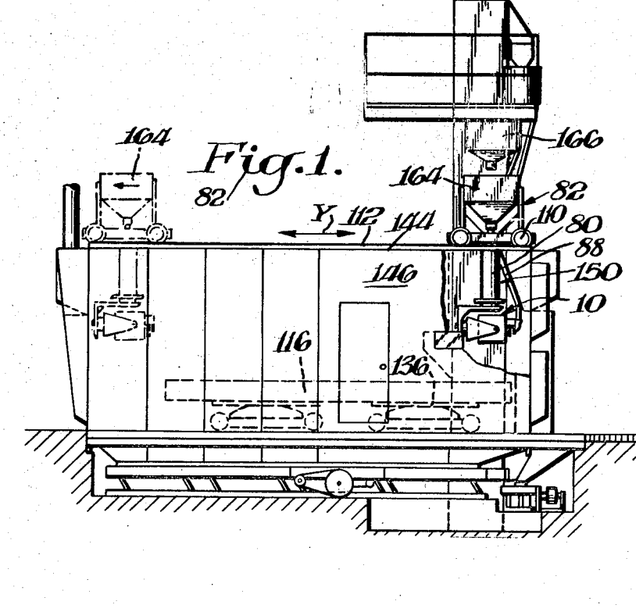
FIG. 1 is an elevational view partly broken away of one embodiment of this invention.
Figure 2:
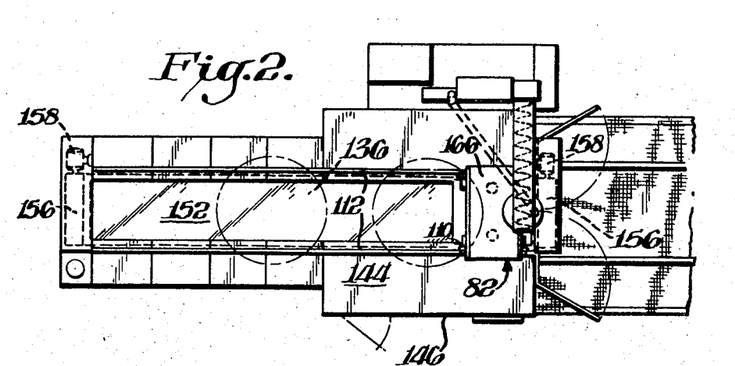
FIGS. 2 and 3 are plan and end views respectively of the embodiment of the invention shown in FIG. 1.
Figure 3:
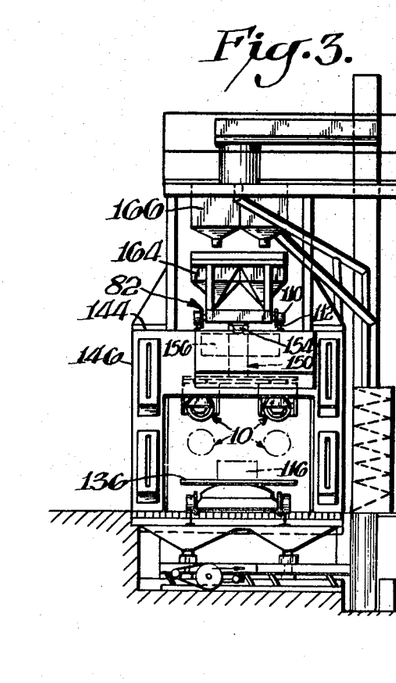
Figures 4, 5:
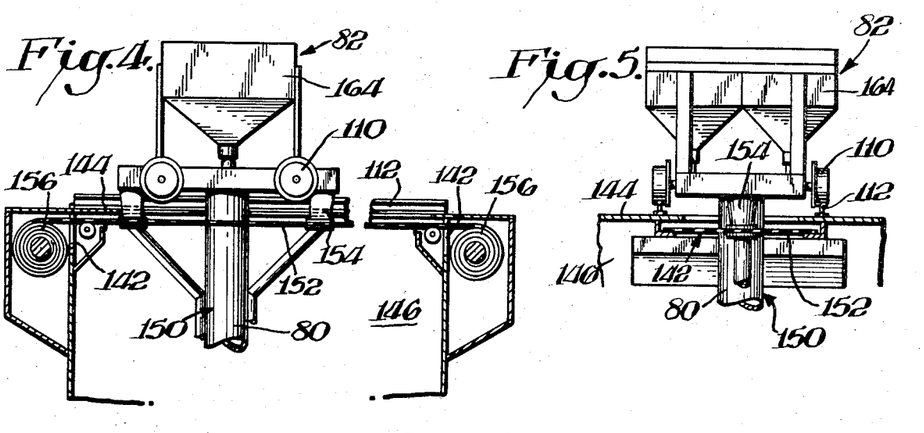
FIG. 4 is a cross-sectional view in elevation of the apparatus shown in FIG. 2.
FIG. 5 is a cross-sectional view in elevation of the apparatus shown in FIG. 1.

FIGS. 1–3 show an arrangement which include a pair of wheels 10 mounted on boom or tube 80. In this arrangement the horizontal travel is too great to use a screw feed or telescoping feed spout which is quite suitable for the one wheel arrangement. The arrangement shown in FIGS. 1–3 is designed to peen parts on table 136 or to traverse over long parts such as aircraft spars and similar shapes. When peening long parts, the self-powered table 136 is run to the center of the machine.

Since the screw feed and telescoping feed spout arrangements are not suitable for long horizontal travel, a bin 164 is mounted directly on the car 82. The bin is automatically refilled each time the boom returns to its initial position (in the extreme righthand portion of FIG. 1) from storage bin 166. A roof seal as previously described is suitable with this arrangement.

The unit described in FIGS. 1–3 is also adaptable to carry a greater number of machines than the two machines illustrated. With such an arrangement of plural machines the self-powered table 136 indexes or travels at right angles to the horizontal travel of the wheels 10.

An advantageous modification of this invention is to form clamps 154 as hollow members which may be utilized as feed tubes for feeding the particles to the wheel.

The arrangements described above have a number of advantages over prior practice. For example, with prior art arrangements used for blasting long parts the long parts were moved and the wheels stationary. This required a cabinet which was over twice as long as the part being cleaned. With the inventive arrangement, however, the machine length is only slightly longer than the part. Additionally, previous machines include stationary mounted wheels to obtain various angles of blast or positions whereby it was necessary to move the parts or to use multiple wheels. With the inventive arrangement, however, the parts are not moved and the wheel moves to the best blasting angle and position. Moreover, more work can be done in a given time with a given horsepower because the wheel 10 can be programmed to hit parts at optimum angles.

A still further aspect of this invention is illustrated in FIG. 38. The arrangement illustrated therein is particularly designed to reduce the overhung load on the motor shaft and includes an impeller 168 in impeller cage 170 with the motor shaft 172 extending through the cage 170 into the impeller 168. This allows the placing of the center of mass 174 close to the motor bearing.

The FIG. 38 arrangement also utilizes a "C" flanged motor to keep the bearings close to the center of mass 174 and also to maintain a compact wheel unit. Moreover, since the wheel 10 may be used for peening expensive aircraft parts, special care is taken to securely fasten the wheel components. Thus, runnerhead 130 is bolted to hub 176. Hub 176 in turn is clamped to the motor shaft and is also retained in place by lip 178 on the upper and lower wear shield and/or retainer 180. Lip 178 is advantageously relieved to allow the abrasive to drain.

The wheel described above is particularly effective in assuring positive prevention of axial movement. The entire wheel assembly is enclosed in a housing having a smooth interior with respect to the front plate 182. Although it is improbable if the wheel assembly should work loose it would be captivated behind the front plate 182. The breakage of vanes 126 would be minimized because of a rubbing rather than a striking action between the vane 126 and front plate 182.

The wheel 10 illustrated in FIG. 38 has a number of advantages over prior wheels. For example, the unit is compact and lends itself to the universal mounting. Accordingly, by direct mounting to the motor the wheel 10 does not need a drive unit which includes the conventional bearings, sheaves, belts, seals, and lubrication system.

Obviously many modifications and variations of this invention are possible in light of the above teachings. It is, therefore, to be understood that within the scope of the appended claims the invention may be practiced otherwise than specifically described.

What is claimed is:
1. A workpiece treating apparatus comprising a throwing wheel including a runnerhead, a plurality of throwing vanes radially mounted on said runnerhead, drive means for rotating said runnerhead and said vanes, particle feed means for supplying treating particles to said runnerhead to be discharged from said vanes, universal mounting means for permitting said wheel to rotate about a plurality of axes, in combination therewith, a treating cabinet having a roof, an elongated slot in said roof, wheel moving means on said roof, wheel mounting means connected to said wheel moving means and extending through said slot, said throwing wheel being secured to said wheel mounting means, and sealing means connected to said wheel moving means and sealing said slot.

2. An apparatus as set forth in claim 1 wherein said sealing means includes a belt disposed against said slot and having a pair of ends, an air motor at each end of said slot, each end of said belt being secured to one of said air motors, and said air motors pulling said belt in opposite directions to hold said belt taut against said slot.

3. An apparatus as set forth in claim 2 wherein said feed means are capable of continuously feeding particles to said wheel as said wheel moves in said cabinet.

4. An apparatus as set forth in claim 3 wherein said wheel moving means includes a movable car, said feed means including a screw conveyor on said car, and a stationary storage bin disposed for supplying particles to said screw conveyor.

5. An apparatus as set forth in claim 3 wherein said feed means includes a storage bin, and telescopic feed tubes between said bin and said wheel.

6. An apparatus as set forth in claim 3 wherein a plurality of said throwing wheels are secured to said wheel mounting means, said wheel moving means including a movable car, and said feed means including a particle supply bin mounted on said car.

7. An apparatus as set forth in claim 6 including workpiece moving means for conveying a workpiece in a direction perpendicular to said slot.

8. An apparatus as set forth in claim 2 wherein said belt is connected to said wheel moving means by hollow clamps, and said hollow clamps being part of said feed means.

9. A workpiece treating apparatus comprising a throwing wheel including a runnerhead, a plurality of throwing vanes radially mounted on said runnerhead, drive means for rotating said runnerhead and said vanes, particle feed means for supplying treating particles to said runnerhead to be discharged from said vanes, universal mounting means for permitting said wheel to rotate about a plurality of axes, wherein said mounting means is rigid for holding said wheel in a preselected position after being rotated about said axes.

10. An apparatus as set forth in claim 9 wherein said mounting means includes a first mounting unit, first horizontal pivot means connecting said wheel to said first mounting unit for rotating said wheel about a first horizontal axis, a second mounting unit, second horizontal pivot means connecting said first unit to said second unit for rotation of said first unit and said wheel about a second horizontal axis perpendicular to said first axis, a third mounting unit, and vertical pivot means connecting said third unit to said second unit for rotation of said first and second units and of said wheel about a vertical axis perpendicular to said horizontal axis.

11. An apparatus as set forth in claim 10 including locking means for setting the degree of rotation of said wheel about said first horizontal axis.

12. An apparatus as set forth in claim 11 wherein said locking means includes rough setting means for setting the angular orientation of said wheel at predetermined angular intervals, and fine setting means for setting the angular orientation of said wheel between said intervals.

13. An apparatus as set forth in claim 10 including vertical mounting means for moving said wheel in a vertical direction, said vertical mounting means including telescopic tube means, said third mounting unit being connected to said telescopic tube means, means for causing relative movement of said telescopic tube means in a vertical direction, and said feed means being extendable.

14. An apparatus as set forth in claim 13 wherein said extendable feed means includes swivel means, telescopic feed tube means connected to said swivel means, spout means connected to said wheel, and said telescopic feed tube means being disposed for directing treating particles into said spout means.

15. An apparatus as set forth in claim 14 wherein said spout means are connected for rotational movement up to 45° about said first horizontal axis and up to 270° about said vertical axis without adjustment thereof.

16. An apparatus as set forth in claim 13 wherein said extendable feed means includes spout means connected to said wheel, and roller and guide track means connected to said spout means to permit said spout means to swivel and rotate up to 270° about said second horizontal axis.

17. An apparatus as set forth in claim 13 wherein said extendable feed means includes flared spout means connected for up to 30° pivotal movement on each side of the vertical about said second horizontal axis.

18. An apparatus as set forth in claim 17 including a swivel means for said spout means to permit said spout means to rotate up to 270° about said vertical axis.

19. An apparatus as set forth in claim 13 including means for moving said third mounting unit back-and-forth in a horizontal plane.

20. An apparatus as set forth in claim 19 including means for moving said third mounting unit from side-to-side in a horizontal plane.

21. An apparatus as set forth in claim 20 wherein said means for moving said third mounting unit from side-to-side includes a first movable car with said telescopic tube means mounted on said first movable car, and said means for moving said third mounting unit back-and-forth includes a second movable car with said first movable car being mounted within said second movable car.

22. An apparatus as set forth in claim 20 wherein said means for moving said third mounting unit back-and-forth includes a movable car, and said means for moving said third mounting unit from side-to-side includes screw conveyor means connected to said car.

23. A workpiece treating apparatus comprising a throwing wheel including a runnerhead, a plurality of throwing vanes radially mounted on said runnerhead, drive means for rotating said runnerhead and said vanes, particle feed means for supplying treating particles to said runnerhead to be discharged from said vanes, universal mounting means for permitting said wheel to rotate about a plurality of axes, in combination therewith, wherein said drive means is reversible whereby the direction of rotation of said runnerhead and vanes may be reversed, each vane having a pair of symmetrical particle propelling faces, said wheel including means for varying the direction of the stream of particles discharged from said vanes, a treating cabinet having a roof, an elongated slot in said roof, a movable car mounted on said roof, telescopic tube means connected to said car and extending through said slot, said throwing wheel being secured to said telescopic tube means, a belt disposed against said slot and having a pair of ends, an air motor at each end of said slot, each end of said belt being secured to one of said air motors, hollow clamp means securing said belt to said car, said air motors pulling said belt in opposite directions to hold said belt taut against said slot, said driving means including a motor having a drive shaft and bearings, said runnerhead being connected to a hub, said hub being clamped to said drive shaft, the center of mass of said wheel being close to said bearings, an impeller mounted in an impeller cage on said runnerhead, said drive shaft protruding thru said impeller cage into said impeller, said hub having a flange, a wear shield having a lip disposed adjacent said flange to retain said hub in place, said lip being relieved to permit the drainage of particles, said mounting means being rigid for holding said wheel in a preselected position after being rotated about said axes, said rigid mounting means including a first mounting unit, first horizontal pivot means connecting said wheel to said first mounting unit for rotating said wheel about a first horizontal axis, a second mounting unit, second horizontal pivot means connecting said first unit to said second unit for rotation of said first unit and said wheel about a second horizontal axis perpendicular to said first axis, a third mounting unit, vertical pivot means connecting said third unit to said second unit for rotation of said first and second units and of said wheel about a vertical axis perpendicular to said horizontal axes, rough setting means for setting the angular orientation of said wheel at predetermined angular intervals, said rough setting means including a disc having notches disposed at said angular intervals and plunger means for engaging said notches, fine setting means for setting the angular orientation of said wheel between said intervals, said first setting means including a swivel means, telescopic feed tube means connected to said swivel means, spout means connected to said wheel, and said telescopic feed tube means being disposed for directing treating particles into said spout means.

24. A workpiece treating apparatus comprising a treating cabinet having a roof, an elongated slot in said roof, a movable car, a workpiece treating device in said cabinet, mounting means connecting said device to said car through said slot whereby the movement of said car causes said device to move, an air motor at each end of said slot, a belt having a pair of ends, each of said ends being connected to one of said air motors, said belt being connected to said car whereby movement of said car causes said belt to move, and said air motors pulling said belt in opposite directions and maintaining said belt taut against said slot to seal said slot.

25. An apparatus as set forth in claim 24 wherein hollow clamp means secures said belt to said car, feed means for feeding treating media from above said roof to said treating device, and said feed means including said hollow clamp means.

26. An apparatus as set forth in claim 10 including hydraulic actuating means for rotating said first mounting unit about said first horizontal axis, for rotating said second mounting unit about said second horizontal axis, and for rotating said third mounting unit about said vertical axis, and hydraulic brake means for locking each of said units in its respective position with respect to its axis of rotation.

27. A feed device for a particle throwing apparatus comprising a mounting flange having a central opening therethrough, an offset feed spout having an enlarged opening for receiving particles therein, said enlarged opening communicating with said central opening of said mounting flange whereby the particles received in said spout may be discharged through said central opening, and a plurality of rollers secured to said mounting flange remote from said feed spout to provide bearing means whereby the feed device may swivel with respect to the particle throwing apparatus.

28. A feed device as set forth in claim 27, in combination therewith, a particle throwing apparatus, said apparatus including particle receiving means communicating with said device, a guide track mounted on said apparatus, and said rollers being mounted on said track to permit said device and said apparatus to swivel with respect to each other.

29. A workpiece treating apparatus comprising a throwing wheel including a runnerhead, a plurality of throwing vanes radially mounted on said runnerhead, drive means for rotating said runnerhead and said vanes, particle feed means for supplying treating particles to said runnerhead to be discharged from said vanes, universal mounting means for permitting said wheel to rotate about a plurality of axes, said drive means including a motor having a drive shaft and bearings, said runnerhead being connected to a hub, said hub being clamped to said shaft, the center of mass of said wheel being close to said bearings, and impeller mounted in an impeller cage on said runnerhead, said shaft protruding through said impeller cage into said impeller, said hub having a flange, a wear shield having a lip disposed adjacent said flange to retain said hub in place, and said lip being relieved to permit the drainage of particles.

References Cited

UNITED STATES PATENTS

| | | | |
|---|---|---|---|
| 2,263,321 | 11/1941 | Unger | 51—9 |
| 2,869,289 | 1/1959 | Gossard | 51—9 |
| 3,015,913 | 1/1962 | Anderson | 51—9 |
| 3,262,228 | 7/1966 | Schenck | 51—9 |

LESTER M. SWINGLE, Primary Examiner

U.S. Cl. X.R.

72—53

UNITED STATES PATENT OFFICE
CERTIFICATE OF CORRECTION

Patent No. 3,521,406        Dated July 21, 1970

Inventor(s) James H. Carpenter, Jr.

It is certified that error appears in the above-identified patent and that said Letters Patent are hereby corrected as shown below:

Column 4, line 49, "settings" should be --- setting ---

Column 5, line 12, "at" (first occurrence) should be --- as ---

Column 5, line 52, "fed" should be --- feed ---

Column 5, line 75, "by" should be --- to ---

Column 10, line 59, "first" should be --- fine ---

Column 10, line 60, after "a" should be inserted --- interengageable plate and clamp means, said feed means including ---

(SEAL)
Attest:

Edward M. Fletcher, Jr.
Attesting Officer

WILLIAM E. SCHUYLER, JR.
Commissioner of Patents